United States Patent Office 3,097,705
Patented July 16, 1963

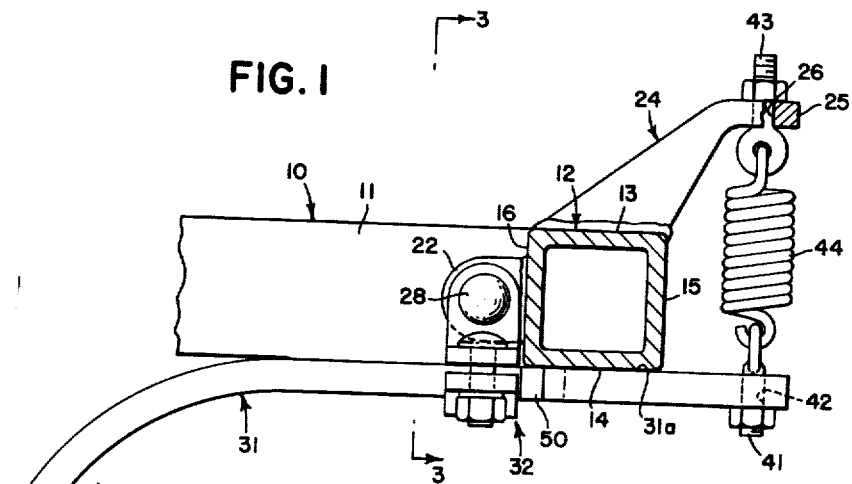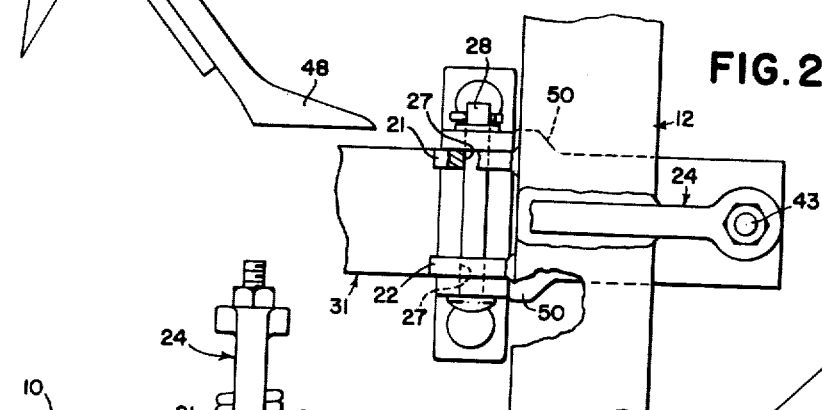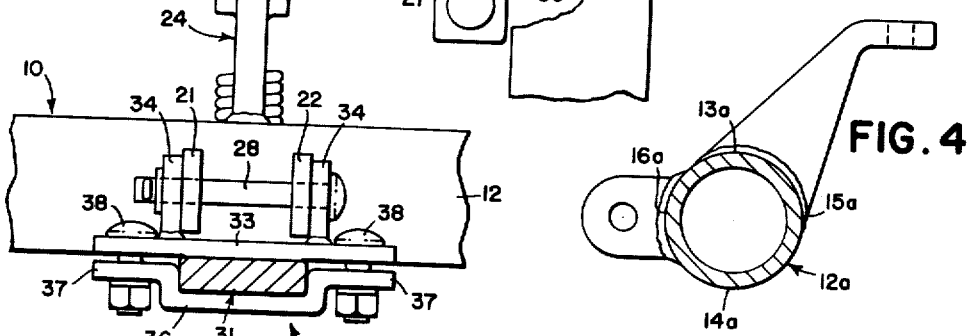
INVENTOR.
EDWARD C. BOPF

3,097,705
FLAT SPRING STANDARD MOUNTING
Edward C. Bopf, Des Moines, Iowa, assignor to Deere & Company, Moline, Ill., a corporation of Delaware
Filed June 26, 1961, Ser. No. 119,505
4 Claims. (Cl. 172—710)

This invention relates generally to agricultural implements and more particularly to tillage tools of the chisel point field plow or cultivator type wherein an elongated wheeled frame extending generally transversely of the direction of travel carries a plurality of laterally spaced apart ground working tools in the form of narrow plows or chisels having a limited amount of flexibility and set to operate fairly deep in the ground.

The object and general nature of this invention is the provision of the new and improved arrangement for connecting each ground working tool to the associated frame beam or tool bar whereby each tool is permitted to have limited spring-resisted flexibility relative to the associated tool bar without entailing complicated hingedly connected members or the like.

More specifically, it is a feature of this invention to provide a vibratory tool mounting in which simple pivot means interconnects the tool to the tool bar at one side of the tool bar while other connecting means, acting independently of the first connecting means, provides a yielding or resilient connection between the forward end of the ground working tool standard and associated bracket means fixed to the tool bar, generally at or adjacent the other side of the tool bar.

It is a further feature of this invention to provide a clamping type of hinged connection between the tool standard and the tool bar in which the tool standard is not required to have any openings therein but, instead, integral lug means formed on the tool standard acts to prevent any shifting of the latter relative to the pivotal clamping means. By virtue of this construction, there are no openings made in the tool standard adjacent the hinged connecting or clamping means that might provide a point of weakening such that continued flexing might eventually cause fracture and breakage or failure at this point.

These and other objects and advantages of this invention will be apparent to those skilled in the art after a consideration of the following detailed description, taken in conjunction with the accompanying drawings, in which:

FIG. 1 is a fragmentary side view, with certain parts shown in section, showing a portion of a tool carrier equipped with flat cushion spring standards and associated mounting means therefor incorporating the principles of this invention.

FIG. 2 is a fragmentary view, being a plan view of the mounting parts shown in FIG. 1.

FIG. 3 is a view taken generally along the line 3—3 of FIG. 1.

FIG. 4 is a fragmentary side view of an alternative form of tool bar.

Referring first to FIG. 1, the frame of the tool carrier of this invention is indicated generally by the reference numeral 10 and includes end bars 11 and transverse tool-supporting bars 12, only one of which is shown in the drawings. Preferably, each tool bar 12 is square in cross section and in the form of a pipe member or the like. If desired, the transverse tool bar may be round, as shown in FIG. 4, the round tool bar being indicated at 12a. As shown in FIG. 1, the tool bar 12 includes an upper side 13, a bottom side 14, and front and rear sides 15 and 16. Similarly, the round tool bar 12a has an upper side 13a, a lower side 14a, and front and rear sides 15a and 16a.

Secured to the rear side 16 of the tool bar 12 is a pair of rearwardly extending apertured lugs 21 and 22, the lugs being welded to the rear sides 16 in laterally spaced apart relation as best shown in FIGS. 2 and 3. An upper bracket 24 is fixed, as by welding, to the upper side 13 of the tool bar 12, the bracket 24 extending upwardly and forwardly, as best shown in FIG. 1, and terminating in a forwardly extending horizontal portion 25 that is disposed above and forward of the front side 15 of the transverse tool bar 12. The forwardly extending lug section 25 is apertured, as at 26. The apertures in the rearwardly extending lugs 21 and 22 are indicated at 27, FIG. 2. A pivot pin 28 extends through the apertures 27.

Disposed on and embracing a spring standard 31 is a hinge bracket 32 that, as best shown in FIG. 3, includes an upper section comprising a flat strap 33 having a pair of upwardly extending apertured lugs 34 swingable on the pivot 28 that is carried by the lugs 21 and 22. The hinge bracket 32 also includes a lower clip 36 that is provided with offset apertured ends 37 receiving bolts 38 that when tightened clamp the standard 31 in position between the flat strap section 33 and the clip 36. The hinge bracket 32 and the apertured frame-carried lugs 21 and 22 are so located that when the standard 31 is clamped in place, as shown in FIG. 3, the forward end portion 31a of the standard 31 lies just below and substantially in contact with the lower side 14 of the tool bar 12 in the normal position of the standard 31.

An eye bolt 41 is disposed in an opening 42 formed in the forwardmost end portion of the standard 31, and a similar eye bolt 43 is disposed in the bracket opening 26. A tension spring 44 is connected at its end with the eye bolts 41 and 43, and the parts are so arranged that the spring 44 exerts a constant tension holding the front end of the standard 31 against the lower face 14 of the tool bar 12. However, if the lower or working element of the standard 31, represented by the chisel point 48, FIG. 1, should encounter an obstruction or exceedingly hard ground, the standard 31 will swing upwardly and rearwardly against tension exerted by the spring 44, moving about the axis defined by the pivot bolt 28. However, after the hard spot or obstruction has been passed, the spring 44 draws the standard back to the position shown in FIG. 1.

In order to prevent the standard 31 from slipping rearwardly in the pivoted hinge bracket 32 due to draft forces, the forward end portion of the standard 31 is upset at laterally opposite sides, forming laterally extending lugs 50, FIGS. 1 and 2, that bear against the hinge bracket 32. Thus, there is no requirement to have bolt-receiving openings or the like in the standard 31 at this point, which would tend to weaken the standard and concentrate stresses at this point.

While I have shown and described the preferred structure in which principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. Means mounting an earth working vibratory tool having an upper generally horizontal forwardly extending shank and a lower ground engaging portion to a generally transverse support bar, comprising rearwardly extending apertured lug means fixed to the rear side of said support bar, upwardly extending apertured first bracket means connected with said shank rearwardly of the front end thereof, pivot pin means pivotally connecting said first bracket means to said apertured lug means to the rear of said support bar to provide upward and rearward swinging of the rear end portion of said tool, an intermediate portion of the shank contacting the lower face of said support bar and a forward portion of the shank extending forwardly of the forward face of said support bar, second bracket means fixed to said support bar and extending generally forwardly therefrom, and spring means extending downwardly from said second bracket means to the forward portion of the shank to yieldably restrain swinging of the front end of the latter downwardly and rearwardly about the pivot axis defined by said apertured lug means.

2. In a ground-working implement, a generally transverse tool bar substantially square in cross section, a first pair of apertured lugs fixed to the rear side of said tool bar and extending rearwardly therefrom in laterally spaced apart relation, a bracket fixed to an upper face of said square tool bar and extending forwardly and upwardly therefrom to a position forwardly and upwardly from said tool bar, the upper end of said bracket extending horizontally forwardly and apertured, a flat spring standard having an upper forward horizontal portion and a rear downward curved portion terminating in a ground-engaging section, a hinge bracket including a flat plate disposed against the upper flat face of said standard, a second pair of spaced apart apertured lugs mounted on said plate, pivot means swingably connecting the second pair of lugs to said first pair of apertured lugs, a clip underlying said standard and fixed at its ends to the ends of the flat plate of said hinge bracket, said hinge bracket and said first pair of apertured lugs being located relative to said tool bar such that normally the forward end of said standard is disposed up against the lower face of the tool bar and extends forwardly of the forward side of the tool bar, and a spring connected at one end to the upper end portion of said first bracket and to the forward end portion of said standard to yieldably hold the latter up against the lower face of the tool bar.

3. In an agricultural implement including a transverse tool bar and an earth working tool having an upper generally horizontal forward extending shank portion and a lower ground engaging portion, means for mounting said tool on said tool bar comprising rearwardly extending lug means fixed to the rear side of said tool bar, a mounting member embracing the shank portion, upwardly extending lug means fixed to said mounting member, pivot means swingably connecting the upwardly extending lug means to said rearwardly extending lug means, said mounting member and said rearwardly extending lugs being so located relative to said tool bar that normally the forward end of said standard is disposed up against the lower face of said tool bar and extends forwardly of the forward side of said tool bar, abutment means formed integrally with said shank portion and engaging the forward portion of said mounting member, a generally forwardly extending bracket fixed to said tool bar, and spring means acting between said bracket and forward end of said earth working tool to restrain pivoting of the latter.

4. In an agricultural implement including a transverse frame bar and an earth-working tool having an upper generally horizontal forwardly extending shank portion and a lower ground-engaging portion, means for mounting said tool on said frame bar comprising first bracket means fixed to said frame bar and extending generally forwardly therefrom, second bracket means independent of the first bracket means fixed to the rear side of said frame bar, said second bracket means extending rearwardly, means clamped about said tool generally rearwardly of said frame bar and extending upwardly, said last mentioned means being swingably connected to said second bracket means, and spring means connected between the first means and the forward end of said shank portion.

References Cited in the file of this patent
UNITED STATES PATENTS

| | | |
|---|---|---|
| 357,100 | Ross | Feb. 1, 1887 |
| 2,761,368 | Harrop | Sept. 4, 1956 |
| 2,776,614 | Taule | Jan. 8, 1957 |

FOREIGN PATENTS

| | | |
|---|---|---|
| 327,501 | Italy | July 13, 1935 |

UNITED STATES PATENT OFFICE
CERTIFICATE OF CORRECTION

Patent No. 3,097,705                 July 16, 1963

Edward C. Bopf

It is hereby certified that error appears in the above numbered patent requiring correction and that the said Letters Patent should read as corrected below.

Column 3, line 39, for "forward" read -- forwardly --; column 4, line 30, after "first" insert -- bracket --.

Signed and sealed this 31st day of March 1964.

(SEAL)
Attest:

ERNEST W. SWIDER                 EDWARD J. BRENNER

Attesting Officer                 Commissioner of Patents